(12) United States Patent
Okajima et al.

(10) Patent No.: US 10,549,957 B2
(45) Date of Patent: Feb. 4, 2020

(54) METHOD FOR OPERATING LIFTING SET INCLUDING LIFTING APPARATUS AND WATER DEVICE

(71) Applicant: KUBOTA CORPORATION, Osaka-shi, Osaka (JP)

(72) Inventors: Yasunobu Okajima, Amagasaki (JP); Tadao Shinkai, Amagasaki (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 16/228,269

(22) Filed: Dec. 20, 2018

(65) Prior Publication Data

US 2019/0119077 A1    Apr. 25, 2019

Related U.S. Application Data

(60) Division of application No. 14/866,657, filed on Sep. 25, 2015, now abandoned, which is a continuation of
(Continued)

(30) Foreign Application Priority Data

Mar. 27, 2013   (JP) .................................. 2013-066060

(51) Int. Cl.
*B66C 1/66*     (2006.01)
*B01D 61/20*   (2006.01)
(Continued)

(52) U.S. Cl.
CPC ................ *B66C 1/66* (2013.01); *B01D 61/20* (2013.01); *B01D 65/00* (2013.01); *B66C 1/10* (2013.01);
(Continued)

(58) Field of Classification Search
CPC .. B66C 1/66; B66C 1/10; B01D 61/20; B01D 65/00; B01D 2315/06; B01D 2313/56;
(Continued)

(56) References Cited

U.S. PATENT DOCUMENTS 2,335,272 A    11/1943  Grunwell et al.
3,154,203 A    10/1964  Barry et al.
(Continued)

FOREIGN PATENT DOCUMENTS

EP         0510328       10/1992
JP         63-62505      3/1988
(Continued)

OTHER PUBLICATIONS

Search Report dated May 20, 2014 from International Application No. PCT/JP2014/058788.
(Continued)

*Primary Examiner* — Liam Royce
(74) *Attorney, Agent, or Firm* — Beyer Law Group LLP

(57) ABSTRACT

A lifting set includes a lifting apparatus and a water treatment device. In lifting the water treatment device, an engaging member attached to a first attaching position of a frame of the lifting apparatus pivots in a first direction by sliding along a corresponding engageable portion of the water treatment device as the lifting apparatus approaches the water treatment device, and then automatically engages with the engageable portion by pivoting back to a vertical position by weight thereof while the lifting apparatus is further lowered. In installing the water treatment device, the engaging member attached to a second attaching position engages with the engageable portion at a pivoted position pivoted in a second direction, and when the lifting apparatus is further lowered after installation, the engaging member automatically disengages from the corresponding engageable portion
(Continued)

by pivoting back from the second pivoted position to the vertical position by weight thereof.

5 Claims, 7 Drawing Sheets

Related U.S. Application Data application No. PCT/JP2014/058788, filed on Mar. 27, 2014.

(51) Int. Cl.
  *B66C 1/10* (2006.01)
  *C02F 1/44* (2006.01)
  *B01D 65/00* (2006.01)
(52) U.S. Cl.
  CPC ............ *C02F 1/44* (2013.01); *B01D 2313/56* (2013.01); *B01D 2315/06* (2013.01); *C02F 2201/002* (2013.01); *C02F 2303/14* (2013.01)
(58) Field of Classification Search
  CPC ... C02F 1/44; C02F 2201/002; C02F 2303/14
  See application file for complete search history.

(56) References Cited

U.S. PATENT DOCUMENTS

| | | |
|---|---|---|
| 4,128,267 A | 12/1978 | Niblett et al. |
| 5,207,468 A | 5/1993 | Saulnier |
| 5,820,184 A | 10/1998 | Echenay |
| 6,830,683 B2 | 12/2004 | Gundrum |
| 8,388,033 B2 | 3/2013 | Plair |
| 2012/0012514 A1 | 1/2012 | Sasakawa et al. |
| 2016/0016762 A1 | 1/2016 | Okajima et al. |

FOREIGN PATENT DOCUMENTS

| | | |
|---|---|---|
| JP | 2-273505 | 11/1990 |
| JP | H06-218248 | 8/1994 |
| JP | 2002-173288 | 6/2002 |
| JP | 2003-266070 | 9/2003 |
| JP | 2011-255305 | 12/2011 |

OTHER PUBLICATIONS

European Search Report dated Oct. 28, 2016 from European Application No. EP 14774448.

METHOD FOR OPERATING LIFTING SET INCLUDING LIFTING APPARATUS AND WATER DEVICE

CLAIM OF PRIORITY

This application is a Divisional of U.S. patent application Ser. No. 14/866,657, filed on Sep. 25, 2015, which is a Continuation of International Patent Application No. PCT/JP2014/058788, filed on Mar. 27, 2014, which claims priority to Japanese Patent Application No. 2013-066060, filed on Mar. 27, 2013, each of which is hereby incorporated by reference.

BACKGROUND OF THE INVENTION

1. Field of the Invention

The present invention relates to a lifting apparatus capable of engaging with and disengaging from a water treatment device which is to be lifted, a lifting set, and a water treatment facility.

2. Description of the Related Art

A water treatment device is typically provided with an eyebolt on an upper portion thereof, and disposing the water treatment device in a treatment tank requires a series of operations including engaging a hook of a lifting apparatus with the eyebolt, bringing up and down the lifting apparatus, and then disengaging the hook from the eyebolt.

Japanese Patent Publication No. 2011-255305 discloses a lifting apparatus provided with a reference portion to be a reference for positioning the lifting apparatus within a treatment tank, where the lifting apparatus includes a main body portion capable of moving up and down along with a water treatment device, a coupling portion capable of engaging with and disengaging from a hanging portion of the water treatment device, and a positioning portion for positioning the main body portion to the reference portion so as to align the coupling portion with the hanging portion of the water treatment device.

The purpose of this lifting apparatus is to provide a lifting apparatus that can accurately operate a water treatment device from outside of a water tank when the water treatment device is immersed into the liquid and invisible from outside of the water tank. However, it is still necessary for the above-mentioned lifting apparatus to be manually operated with an operation tool to engage the hanging portion and the coupling portion after the coupling portion reaches a predetermined position of the hanging portion of the water treatment device, and thus it is desirable to provide a lifting apparatus in which a hanging portion and a coupling portion are automatically engage with or disengage from each other.

BRIEF DESCRIPTION OF THE INVENTION

In view of the foregoing, an object of the present invention is to provide a lifting apparatus, a lifting set, and a water treatment facility in which cumbersome manual operations are not required to engage/disengage a water treatment device and a hanging tool with/from each other.

In order to achieve the above-mentioned object, a lifting apparatus in accordance with one embodiment of the present invention is capable of engaging with and disengaging from a water treatment device to be lifted. The lifting apparatus includes a frame and an engaging member pivotably attached to the frame by an upper portion thereof in a vertical position, where the engaging member is capable of engaging with an engageable portion of the water treatment device. The engaging member has a first operation state in which the engaging member pivots by contacting the engageable portion as the lifting apparatus approaches the water treatment device from above, and then pivots back to the vertical position as the lifting apparatus further approaches the water treatment device to become closer thereto, whereby the engaging member and the engageable portion become engageable with each other.

By lowering the lifting apparatus from above toward the water treatment device, the engaging member of the lifting apparatus which is set on the frame in the first operation state abuts the engageable portion of the water treatment device so as to pivot around a supporting portion of the engaging member, and when the lifting apparatus is further lowered, the abutment with the engageable portion is released and the engaging member returns to the vertical position from the pivoting position. The engaging member automatically engages with the engageable portion by this returning action to the vertical position. Accordingly, cumbersome manual operations for engagement are unnecessary, and the engaging state can be achieved by simply lowering the lifting apparatus toward the water treatment device from above.

In accordance with one embodiment of the present invention, the engaging member has a second operation state in addition to the first operation state, in which the engaging member disengages from the engageable portion by its own weight or a biased force, when the lifting apparatus further approaches the water treatment device after the water treatment device has been installed into a predetermined position from a lifted state thereof lifted being by the lifting apparatus.

When the water treatment device is lifted in such a condition that the engaging member on the frame set in the second operation state is engaged with the engageable portion of the water treatment device, the water treatment device is transported to the predetermined position and lowered thereto so as to be installed, and then the lifting apparatus is further lowered to get closer to the water treatment device, the engaging member is automatically released from the engageable portion by its own weight or the biased power. Accordingly, cumbersome manual operations for disengagement are unnecessary, and the disengaged state is achieved by simply making the lifting apparatus closer to the water treatment device.

In accordance with one embodiment of the present invention, the first operation state and the second operation state are switched by changing a position to which the engaging member is attached to the frame, or by attaching and releasing a biasing member to the engaging member.

The first operation state and the second operation state can be switched by a changing operation of the position to which the engaging member is attached and supported, or by an attaching/releasing operation of the biasing member. In other words, the switching operation is easily achieved in accordance with the purpose: whether the water treatment device is to be lifted from a predetermined position, or to be installed in the predetermined position.

In accordance with one embodiment of the present invention, the lifting set includes the lifting apparatus having one of the above-mentioned features, and a water treatment device to be lifted by the lifting apparatus.

In accordance with one embodiment of the present invention, the water treatment facility includes a lifting apparatus having any one of the above-mentioned features, a water treatment device, and a tank body in which the water treatment device is immersed in liquid to be treated. The water treatment device may be a membrane separation device.

Another aspect of the present invention provides a method for operating a lifting set including a lifting apparatus and a water treatment device. The lifting apparatus includes a frame and a pair of engaging members, and the water treatment device includes a pair of engageable portions each having a guiding portion. The method includes (i) providing the frame with a pair of first attaching positions and a pair of second attaching positions, the first attaching positions being separated from each other by a first distance, and the pair of second attaching positions being separated from each other by a second distance different from the first distance, (ii) lifting up the water treatment device, and (iii) installing the water treatment device.

The lifting up the water treatment device includes (a) pivotably attaching an upper portion of each engaging member to corresponding one of the first attaching positions of the frame such that a lower portion of the engaging member is capable of rotating around the upper portion, (b) lowering the lifting apparatus toward the water treatment device such that each engaging member pivots in a first direction from a vertical position thereof by sliding along and being in contact with the guiding portion of the corresponding engageable portion, (c) further lowering the lifting apparatus such that the lifting apparatus further approaches the water treatment device, whereby the engaging member passes the guiding portion and automatically pivots back from a first pivoted position to the vertical position by a weight thereof such that the engaging member in the vertical position automatically engages with the corresponding engageable portion, and (d) lifting the lifting apparatus with the water treatment device engaged therewith.

The installing the water treatment device includes (e) pivotably attaching the upper portion of each engaging member to corresponding one of the second attaching positions of the frame such that the lower portion of each engaging member engages with the corresponding engageable portion at a second pivoted position of the engaging member pivoted in a second direction opposite to the first direction, (f) lowering the lifting apparatus to install the water treatment device, (g) further lowering the lifting apparatus such that the lifting apparatus further approaches the water treatment device, whereby each engaging member automatically disengages from the corresponding engageable portion by pivoting back from the second pivoted position to the vertical position by the weight thereof, and (h) raising the lifting apparatus, leaving the water treatment device which has been installed.

In accordance with one embodiment of the present invention, the water treatment device may be a membrane separation device.

In accordance with one embodiment of the present invention, the first and second attaching positions are provided with respective holes formed on the frame.

In accordance with one embodiment of the present invention, the first direction may be one of an outward direction and an inward direction with respect to a center of the frame, and the second direction may be the other of the outward direction and the inward direction.

In accordance with one embodiment of the present invention, the lowering and the further lowering the lifting apparatus include sliding the frame along a guide bar.

As described above, in accordance with the present invention, it became possible to provide a lifting apparatus, a lifting set, a water treatment facility, and a method for operating a lifting set which do not require cumbersome manual operations to engage/disengage a water treatment device and a lifting tool with/from each other.

DETAILED DESCRIPTION OF EMBODIMENTS OF THE INVENTION

Hereinafter, embodiments of the lifting apparatus, the lifting set, and the water treatment facility in accordance with the present invention are explained.

Figure 1:
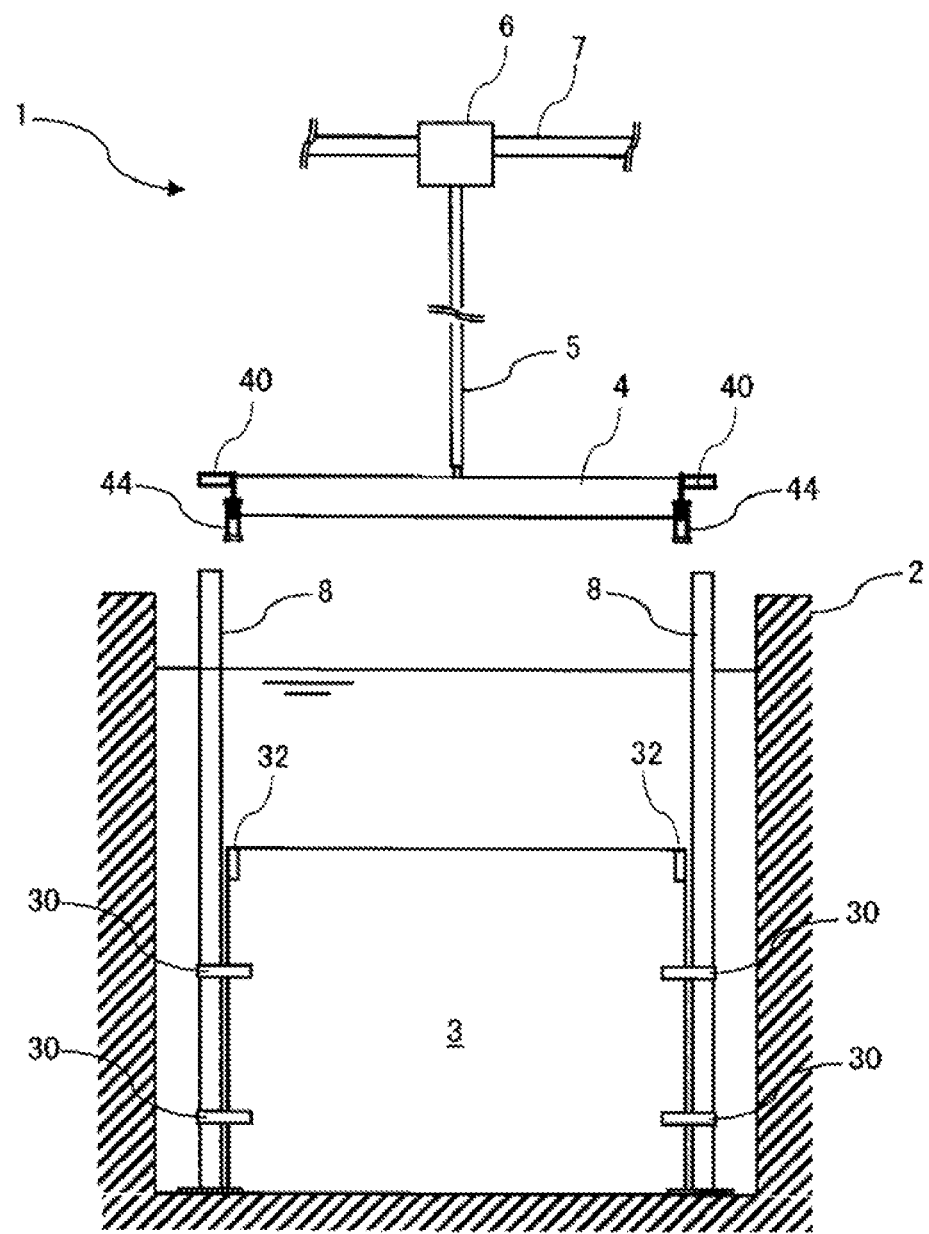
FIG. 1 is a diagram explaining a lifting apparatus and a water treatment device in accordance with the present invention.
Figure 2:
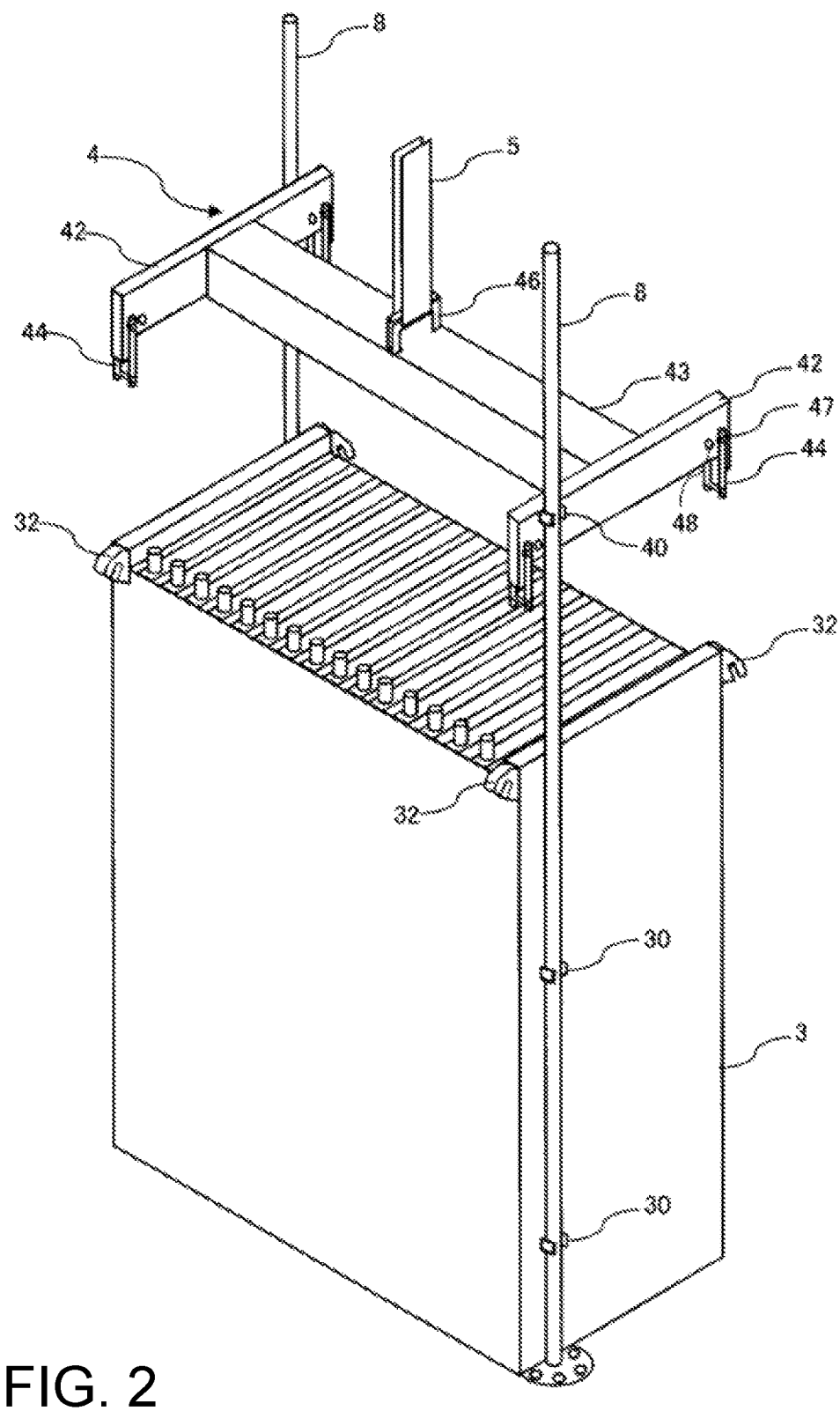
FIG. 2 is a perspective view of the lifting apparatus and the water treatment device in accordance with the present invention.

As shown in FIGS. 1 and 2, a water treatment facility 1 includes a treatment tank 2 which is a tank body, a water treatment device 3 immersed in water to be treated filled in the treatment tank 2, and a lifting apparatus 4 for lifting the water treatment device 3.

The water treatment device 3 is an immersion-type membrane separation device 3 having a membrane module in which a number of plate-shaped membrane elements are disposed in a casing having upper and lower openings such that respective membrane surfaces are vertically positioned and separated from one another by a predetermined distance provided therebetween, and a diffuser device disposed under the membrane module. The treatment tank 2 includes a plurality of membrane separation devices 3 immersed therein.

A lifting apparatus 4 is also provided in order to lift up and transport the membrane separation device 3 in and out of the treatment tank 2 when a routine maintenance is conducted or a broken membrane element is replaced. It should be noted that, although the present embodiment will be explained in such a case where the water treatment device 3 is an immersion-type membrane separation device 3, the water treatment device 3 to be lifted by the lifting apparatus 4 in accordance with the present invention is not limited to a membrane separation device, and the present invention is applicable to any water treatment device submersed in water, such as a submersible pump.

A pair of guide bars 8 are provided for each of the membrane separation devices 3 and fixed to the bottom of the treatment tank 2 so as to stand upright and position the membrane separation device 3 which is immersed therein by engaging with the guide bars 8 by guided portions 30 thereof provided on respective side walls of the membrane separation device 3. The pair of guide bars 8 are disposed in the vicinity of a pair of diagonal corners of the membrane separation device 3 in plan view. The guided portions 30 are provided on upper portion of side walls facing the respective guide bars 8. Each of the guided portions 30 has a pair of plate-shaped protrusions so as to hold the corresponding guide bar 8 from both sides.

The lifting apparatus 4 is hanging from a lifting equipment 6 such as a hoist crane via a cable body 5 such as a sling belt or chain so as to be freely raised and lowered. The lifting equipment 6 is supported by a rail 7 provided thereabove so as to be movable along the rail 7 in a horizontal direction.

Figure 3A:
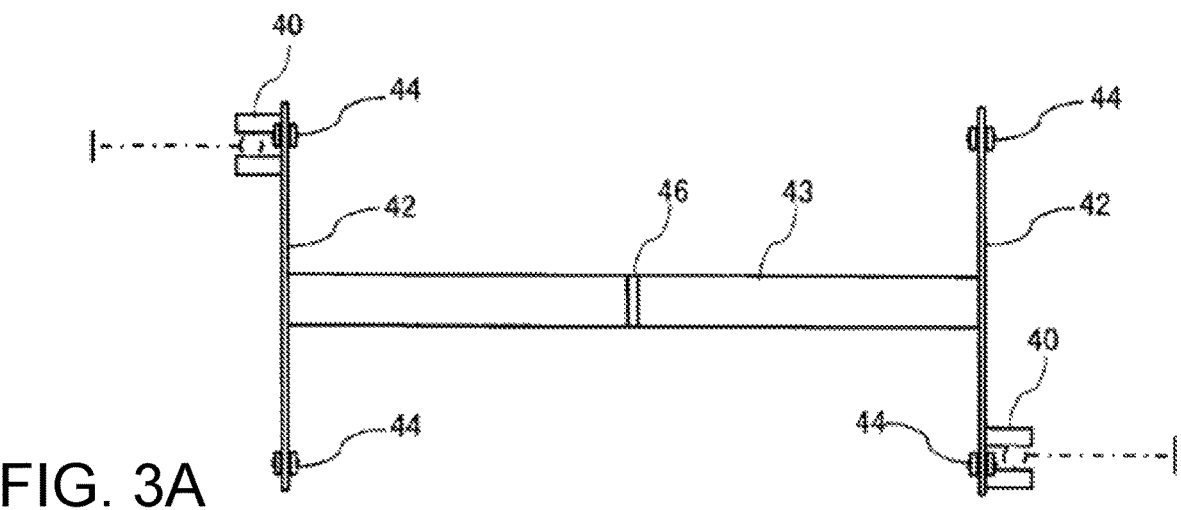
FIG. 3A is a plan view of the lifting apparatus.
Figure 3B:
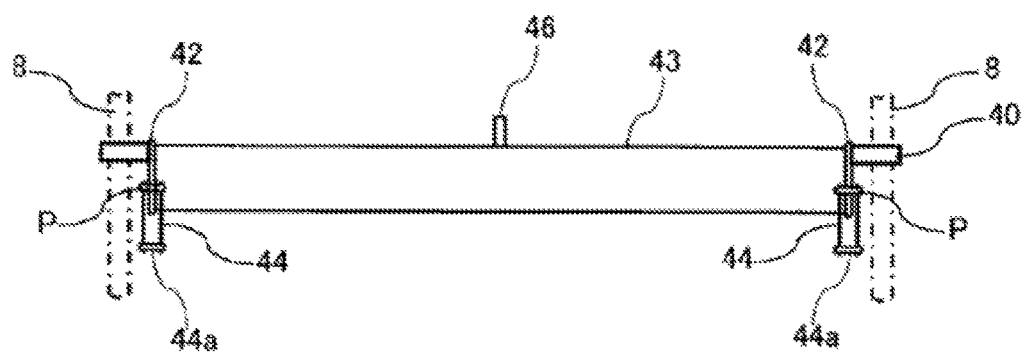
FIG. 3B is a front view thereof.
Figure 3C:
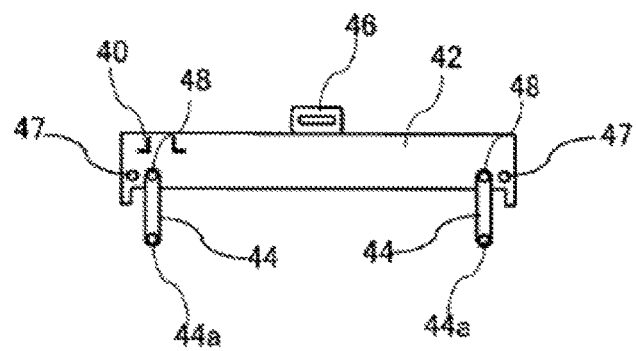
FIG. 3C is a side view thereof.

As shown in FIGS. 3A, 3B, and 3C, the lifting apparatus 4 includes a frame formed of a pair of side frames 42 made of steel plates, and a center frame 43 connecting the side frames 42. Each of the engaging members 44 is attached vertically to the side frames 42 with a pivot pin P such that an upper portion thereof is rotatable.

Each of the engaging members 44 has two elongated plate members lower portions of which are connected via an engaging pin which engages with the engageable portion 32 of the water treatment device 3, while upper portions of which are rockably attached to the side frame 42 with the pivot pin P. The pivot pin P has a screw portion formed at an end thereof so as to be fastened by a nut.

More specifically, each of the side frames 42 has a pair of holes 47 and 48 on each side portion thereof, to which the engaging member 44 can be attached, as shown in FIG. 3C. The engaging member 44 is set to the first operation state when it is attached by inserting the pivot pin P into the inner-side hole 48, while it is set to the second operation state when it is attached by inserting the pivot pin P into the outer-side hole 47. In other words, the engaging member 44 is configured such that the mounting state thereof is changeable between the first operation state and the second operation sate.

In addition, the center frame 43 has an attaching member 46 provided at a center portion thereof, to which the cable body 5 coupling to the lifting equipment 6 is attached. Each of the side frames 42 has a guided portion 40 provided on one side thereof, which engages with a corresponding one of the guide bars 8. The guided portion 40 also has a pair of plate-shaped protrusions so as to hold the guide bar 8 therebetween.

When the membrane separation device 3 immersed in the treatment tank 2 is to be taken out therefrom, the lifting equipment 6 is extended so as to lower and position the lifting apparatus 4 which is set to the first operation state by attaching the engaging member 44 to the inner-side hole 48 such that the each of the guided portions 40 engages with the corresponding guide bars 8.

Figure 4A:
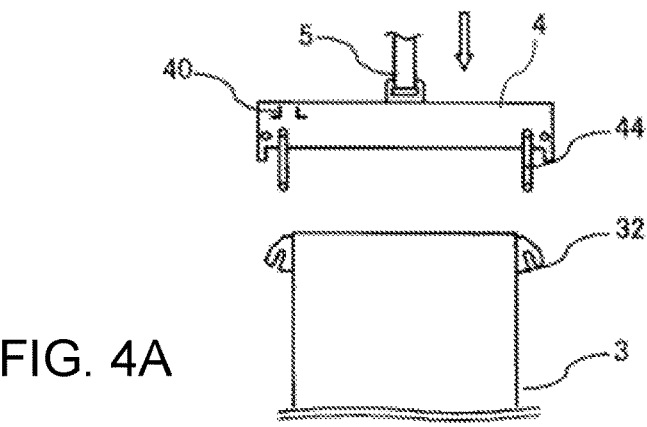
FIGS. 4A through 4D are diagrams explaining a lifting operation of the lifting apparatus in a first operation state.
Figure 4B:
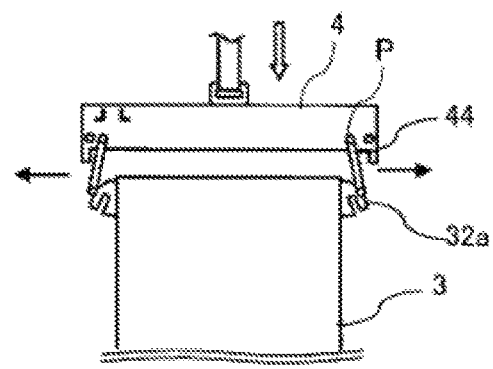

When the lifting apparatus 4 is lowered, each of the engaging members 44 of the lifting apparatus 4 becomes in contact with the respective engageable portion 32 of the membrane separation device 3 from above as shown in FIG. 4A, and when the lifting apparatus 4 is further lowered, each engaging member 44 rocks outwardly along a slope portion 32a of the corresponding engageable portion 32 as shown in FIG. 4B. That is, each engaging member 44 pivots around the pivot pin P thereof.

Figure 4C:
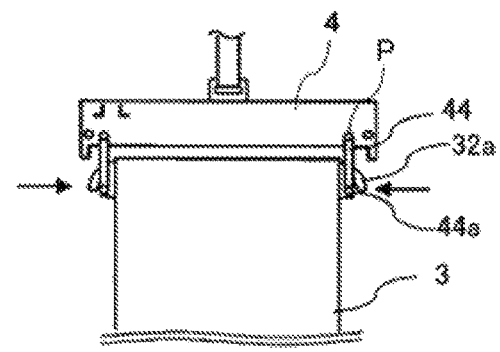

When the lifting apparatus 4 further goes downward as shown in FIG. 4C, each of the engaging members 44 passes the sloped portion 32a of the engageable portion 32 and pivots around the pivot pin P so as to return to its vertical position, whereby the engaging pin of the engaging member 44 and the engageable portion 32 become engageable with each other.

Figure 4D:
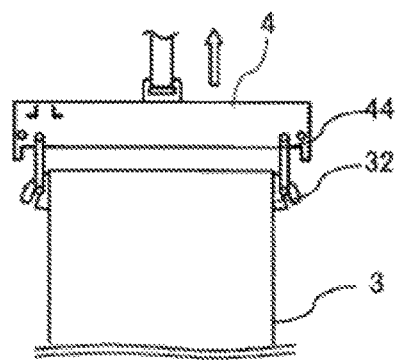

When the lifting equipment 6 is wound up so as to raise the lifting apparatus 4 in this engageable state, the membrane separation device 3 is lifted up from the treatment tank 2 as shown in FIG. 4D.

When the membrane separation device 3 is to be disposed in the treatment tank 2 and immersed therein, the engaging member 44 is first attached to the outer-side whole 47 of the lifting apparatus 4 so as to be set to the second operation state, and then the lifting equipment 6 is wound up so as to raise the lifting apparatus 4 in a state in which the engaging pin of the engaging member 44 of the lifting apparatus 4 and the engageable portion 32 of the membrane separation device 3 are engaged with each other.

Then, the lifting apparatus 4 is transported to a predetermined location along the rail 7 and positioned such that the guided portions 30 of the membrane separation device 3 engage with the corresponding guide bars 8 standing in the treatment tank 2. The lifting equipment 6 is extended so as to lower the lifting apparatus 4, whereby the membrane separation device 3 is disposed in the treatment tank 2 and immersed therein.

Figure 5A:
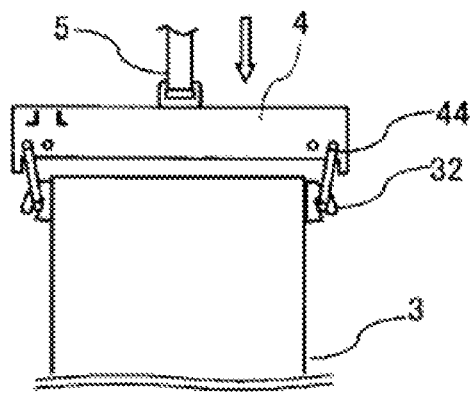
FIG. 5A through 5C are diagrams explaining a lifting operation of the lifting apparatus in a second operation state
Figure 5B:
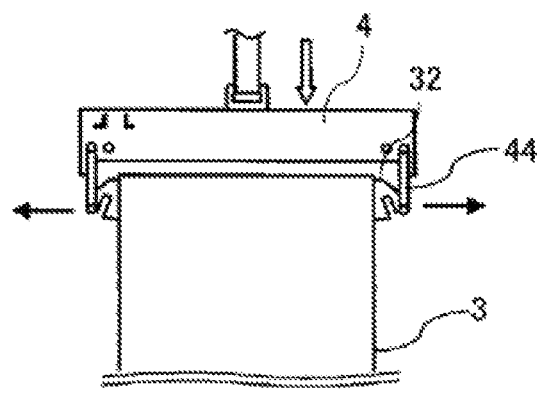

As shown in FIG. 5A, as the lifting apparatus 4 goes down from its lifted state, the engaging pin of the engaging member 44 of the lifting apparatus 4 and the engageable portion 32 of the membrane separation device 3 are gradually disengaged from each other, and when the lifting apparatus 4 is further lowered, the engaging pin of the engaging member 44 is released from the engageable portion 32 and rocks outwardly, i.e., the engaging member 44 pivots around the pivot pin P, thereby returning to its vertical position as shown in FIG. 5B.

Figure 5C:
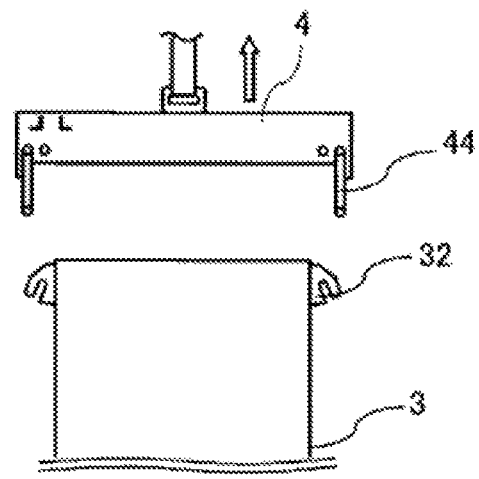

When the lifting equipment 6 is wound up in this state so as to raise the lifting apparatus 4 as shown in FIG. 5C, only the lifting apparatus 4 is lifted up.

In other words, when the membrane separation device 3 is disposed to a predetermined position from the lifted state thereof being lifted by the lifting apparatus 4, and then the lifting apparatus 4 is further brought down and to be closer to the membrane separation device 3, the engaging member 44 is disengaged from the engageable portion 32 by its weight.

Another embodiment is described below. In the embodiment described above, the first operation state is set when the engaging members 44 are attached to the respective side frames 42 by inserting the pivot pin P into the inner-side hole 48, while the second operation state is set when the engaging members 44 are attached by inserting the pivot pin P into the outer-side hole 47. However, the first operation state can be set when the engaging members 44 are attached by inserting the pivot pin P into the outer-side hole 47, while the second operation state can be set when the engaging member 44 is attached by inserting the pivot pin P into the inner-side hole 48.

Figure 6A:
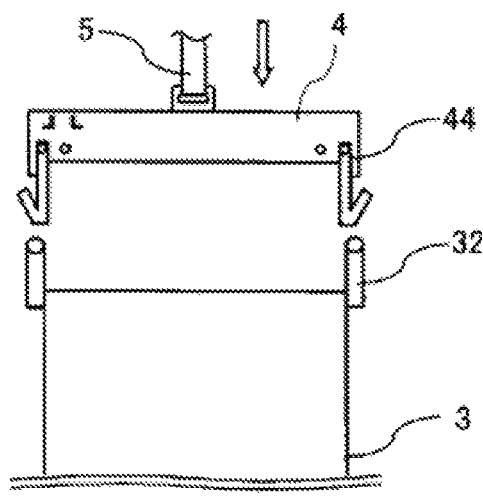
FIGS. 6A through 6C are diagrams explaining a lifting operation of the lifting apparatus in the first operation state in accordance with another embodiment.

For example, for the first operation state, as shown in FIG. 6A, the structure of the craw-like engageable portion 32 described above (see FIG. 4A) and that of the engaging member 44 having the two elongated flat plates separated from each other by the predetermined distance (see FIG. 4A) can be switched each other, such that a claw-like engaging member 44 is used for the lifting apparatus 4, and an engageable portion 32 having two elongated flat plates separated from each other by a predetermined distance is attached to the membrane separation device 3.

Figure 6B:
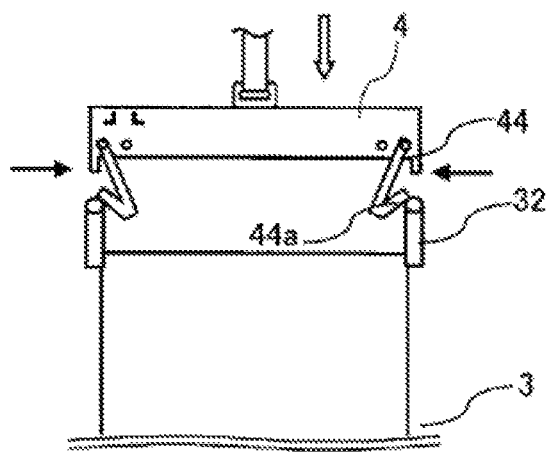

As shown in FIG. 6B, when the lifting apparatus 4 in which the claw-like engaging member 44 is vertically fixed to the outer-side hole 47 to be set to the first operation state goes down toward the membrane separation device 3 from above, a tip of the engageable portion 32 provided to the side wall of the membrane separation device 3 and a slope portion 44a of the engaging member 44 become in contact with each other, whereby the engaging member 44 rocks inwardly.

Figure 6C:
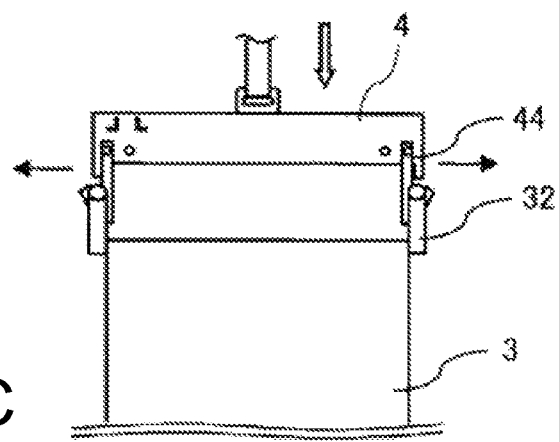

When the lifting apparatus 4 further goes down as shown in FIG. 6C, the claw-like engaging member 44 retunes to its vertical position and engages with the engageable portion 32. When the lifting apparatus 4 is raised in this state, the membrane separation device 3 is lifted up from the treatment tank 2.

On the other hand, the second operation state is set by vertically attaching the claw-like engaging member 44 to the inner-side hole 48 of the lifting apparatus 4, and similarly to the process shown in FIGS. 5A, 5B, and 5C, the engaging member 44 and the engageable portion 32 of the membrane separation device 3 are engaged with each other beforehand, and then the lifting apparatus 4 is lowered toward the treatment tank 2 from above so as to install the membrane separation device 3 therein.

When the lifting apparatus 4 goes further down and gets closer to the membrane separation device 3 after its installation, an inner slope at the tip of the claw portion of the engaging member 44 slides from the engageable portion 32 provided on the side wall of the membrane separation device 3, whereby the engaging member 44 rocks around the pivot pin P and returns to its vertical position such that the engaging member 44 automatically disengages from the engageable portion 32. Thus, the lifting apparatus 4 can be raised in this state.

In the embodiment shown in FIGS. 5A, 5B, and 5C, the engaging member 44 set to the second operation state is released from the engageable portion 32 by its weight when the lifting apparatus 4 comes closer to the membrane separation device 3. However, the engaging member 44 set to the second operation state may be released from the engageable portion 32 by a biased force of an elastic member such as a spring when the lifting apparatus 4 is brought closer to the membrane separation device 3 in another embodiment.

Figure 7A:
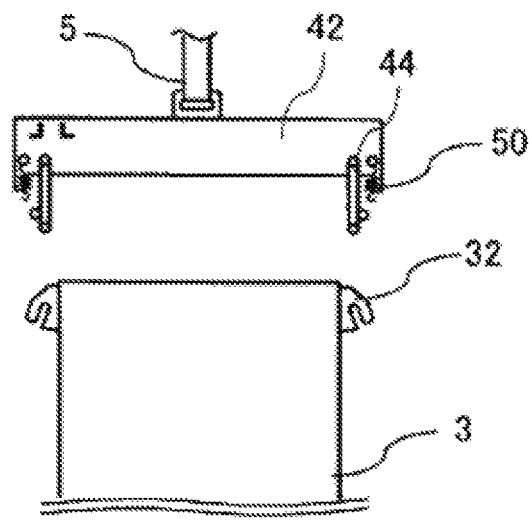
FIGS. 7A through 7C are diagrams explaining a lifting operation of the lifting apparatus in the second operation state in accordance with another embodiment.
Figure 7B:
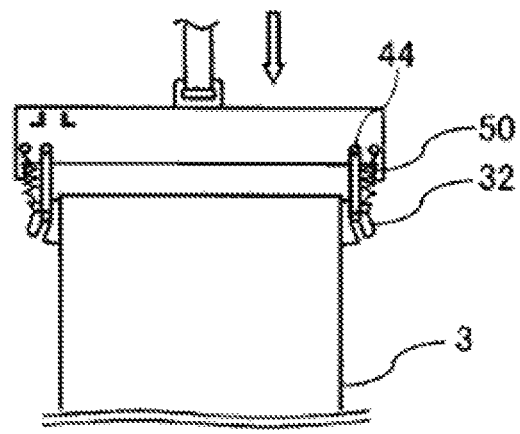
Figure 7C:
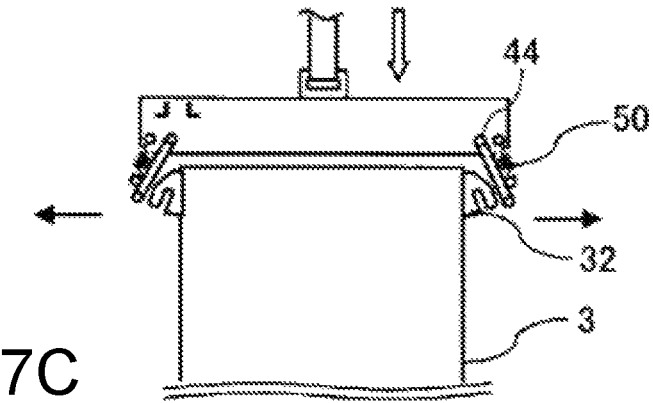

FIGS. 7A, 7B, and 7C illustrate such an embodiment. FIG. 7A shows the first operation state in which each of the engaging members 44 are attached to the side frames 42 by inserting the pivot pin P into the inner-side hole 48. In addition, an end of an elastic biasing member, such as a coil spring 50, is attached to the outer-side hole 47, while another end of the coil spring 50 is detachably attached to an attaching portion of the elongated plate members of the engaging member 44. When the lifting apparatus 4 is lowered in this state, the membrane separation device 3 becomes ready to be lifted up in a similar manner as that illustrated in FIGS. 4A through 4D.

FIGS. 7B and 7C illustrate the second operation state. As shown in FIG. 7B, the membrane separation device 3 is lifted up in such a state where the coil spring 5 is attached to the engaging member 44 while the engaging member 44 is engaged with the engageable portion 32 of the membrane separation device 3, and then brought to a predetermined position of the treatment tank 2, lowered, and installed therein.

As shown in FIG. 7C, when the lifting apparatus 4 is further lowered to become closer to the membrane separation device 3 in a state in which the engaging member 44 is biased outwardly around the pivot pin P by the biasing power of the coil spring 50, the engaging member 44 is automatically disengaged from the engageable portion 32, and when the lifting apparatus 4 is raised in this state, only the lifting apparatus 4 is lifted up. That is, the coil spring 50 functions as a biasing member.

As described above, the lifting apparatus 4 is switchable between the first operation state and the second operation state by changing the attaching position of the engaging member 44 or by attaching/releasing the biasing member 50.

In such a case where a plurality of membrane separation devices 3, for example, two membrane separation devices 3 are stacked in a vertical direction in the treatment tank 2, they can be lifted up one by one by providing the engageable portions 32 to the frame of each of the membrane separation devices 3.

The lifting set of the present invention includes the above-mentioned lifting apparatus 4 and the membrane separation device 3 to be lifted, and the water treatment facility of the present invention includes the lifting set and a tank body in which the water treatment device is immersed in water to be treated.

Each embodiment mentioned above is an example of the present invention, and the present invention is not limited by the description. A design of the specific structure of each part can be changed so long as the function and effect of the present invention can be achieved.

What is claimed is:

1. A method for operating a lifting set including a lifting apparatus and a water treatment device, the lifting apparatus including a frame and a pair of engaging members, and the water treatment device including a pair of engageable portions each having a guiding portion, the method comprising:
   providing the frame with a pair of first attaching positions and a pair of second attaching positions, the first attaching positions being separated from each other by a first distance, and the pair of second attaching positions being separated from each other by a second distance different from the first distance;
   lifting up the water treatment device, including:
      pivotably attaching an upper portion of each engaging member to corresponding one of the first attaching positions of the frame such that a lower portion of the engaging member is capable of rotating around the upper portion;
      lowering the lifting apparatus toward the water treatment device such that each engaging member pivots in a first direction from a vertical position thereof by sliding along and being in contact with the guiding portion of the corresponding engageable portion;
      further lowering the lifting apparatus such that the lifting apparatus further approaches the water treatment device, whereby the engaging member passes the guiding portion and automatically pivots back from a first pivoted position to the vertical position by a weight thereof such that the engaging member in the vertical position automatically engages with the corresponding engageable portion; and
      lifting the lifting apparatus with the water treatment device engaged therewith; and
   installing the water treatment device, including:
      pivotably attaching the upper portion of each engaging member to corresponding one of the second attaching positions of the frame such that the lower portion of each engaging member engages with the corresponding engageable portion at a second pivoted position of the engaging member pivoted in a second direction opposite to the first direction;
      lowering the lifting apparatus to install the water treatment device;

further lowering the lifting apparatus such that the lifting apparatus further approaches the water treatment device, whereby each engaging member automatically disengages from the corresponding engageable portion by pivoting back from the second pivoted position to the vertical position by the weight thereof; and raising the lifting apparatus, leaving the water treatment device which has been installed.

2. The method of claim 1, wherein the water treatment device is a membrane separation device.

3. The method of claim 1, wherein the first and second attaching positions are provided with respective holes formed on the frame.

4. The method of claim 1, wherein the first direction is one of an outward direction and an inward direction with respect to a center of the frame, and the second direction is the other of the outward direction and the inward direction.

5. The method of claim 1, wherein the lowering and the further lowering the lifting apparatus include sliding the frame along a guide bar.

\* \* \* \* \*